United States Patent
Nussbaumer

(10) Patent No.: US 9,810,352 B2
(45) Date of Patent: Nov. 7, 2017

(54) THREADED CONNECTION OF HIGH-PRESSURE FLUID-CARRYING COMPONENTS OF AN INJECTION DEVICE FOR INTERNAL COMBUSTION ENGINES

(71) Applicant: Robert Bosch GmbH, Stuttgart-Feuerbach (DE)

(72) Inventor: Gernot Nussbaumer, Pennewang (AT)

(73) Assignee: ROBERT BOSCH GMBH, Stuttgart-Feuerbach (DE)

( * ) Notice: Subject to any disclaimer, the term of this patent is extended or adjusted under 35 U.S.C. 154(b) by 627 days.

(21) Appl. No.: 13/761,279

(22) Filed: Feb. 7, 2013

(65) Prior Publication Data
US 2013/0200616 A1   Aug. 8, 2013

(30) Foreign Application Priority Data
Feb. 7, 2012   (AT) .................. A 161/2012

(51) Int. Cl.
*B21D 51/16*   (2006.01)
*F16L 15/00*   (2006.01)
(Continued)

(52) U.S. Cl.
CPC ........... *F16L 15/00* (2013.01); *F02M 47/027* (2013.01); *F02M 55/005* (2013.01);
(Continued)

(58) Field of Classification Search
CPC ................ F02M 47/027; Y10T 29/49432
(Continued)

(56) References Cited

U.S. PATENT DOCUMENTS 418,752 A * 1/1890 Rogers .................. F16L 47/22
1,953,610 A * 4/1934 Hunter .................. F02M 45/08
239/89
(Continued)

FOREIGN PATENT DOCUMENTS

| AT | 509877 A4 | 12/2011 |
| WO | 2009/033304 A1 | 3/2009 |
| WO | 2012/058703 A1 | 5/2012 |

OTHER PUBLICATIONS

Pipeline Design Consideration, published by SPE, [online], [retrieved on Apr. 21, 2017], Retrieved from the Internet <http://petrowiki.org/Pipeline_design_consideration_and_standards>.*
(Continued)

*Primary Examiner* — Gregory J Binda
(74) *Attorney, Agent, or Firm* — Fitch, Even, Tabin & Flannery, LLP

(57) ABSTRACT

In a method for producing a threaded connection between a first component and a second component of an injection device for internal combustion engines, which are each provided for carrying high-pressure fluid, an internal thread is formed on a tubular end portion of the first component, into which the second component can be screwed and clamped against a resting surface of the first component, the second component having formed thereon an external threaded portion for engaging the internal thread of the tubular end portion, an outer ring imparting an elastic prestress acting in the radial direction is pressed onto the tubular end portion, and the components are subsequently screwed together.

7 Claims, 2 Drawing Sheets

(51) Int. Cl.
F02M 47/02 (2006.01)
F02M 55/00 (2006.01)
F02M 61/16 (2006.01)
F16L 19/02 (2006.01)

(52) U.S. Cl.
CPC ......... F02M 61/168 (2013.01); F16L 15/001 (2013.01); F16L 19/0206 (2013.01); F02M 2200/03 (2013.01); F02M 2200/40 (2013.01); F02M 2200/8076 (2013.01); Y10T 29/49432 (2015.01); Y10T 29/49881 (2015.01)

(58) Field of Classification Search
USPC .... 285/92, 333–334, 355, 390; 60/746, 747; 138/30; 29/890.142; 239/89, 239/533.2–533.12
See application file for complete search history.

(56) References Cited

U.S. PATENT DOCUMENTS

| | | | | |
|---|---|---|---|---|
| 2,513,621 A * | 7/1950 | Boice | ................. | E21B 17/1085 175/325.2 |
| 3,268,275 A * | 8/1966 | Laghlin | ................ | E21B 17/1042 175/325.2 |
| 3,942,824 A * | 3/1976 | Sable | ................. | E21B 17/1042 175/325.5 |
| 4,380,347 A * | 4/1983 | Sable | .................. | E21B 17/04 175/325.3 |
| 4,463,900 A * | 8/1984 | Wich | .................. | F02M 59/366 |
| 4,527,737 A * | 7/1985 | Deckard | ................ | F02M 57/02 239/89 X |
| 5,466,014 A * | 11/1995 | Cummings | ............. | F16L 33/08 285/148.26 |
| 7,086,669 B2 * | 8/2006 | Evans | ................... | E21B 17/042 285/333 |
| 7,581,766 B2 * | 9/2009 | Verger | ................. | E21B 17/042 285/333 |
| 8,201,855 B2 * | 6/2012 | Larsson | ................. | F16L 15/08 285/390 X |
| 8,336,524 B2 | 12/2012 | Ganser et al. | | |
| 9,447,720 B2 * | 9/2016 | Graspeuntner | ...... | F02M 47/027 |
| 2006/0061099 A1 * | 3/2006 | Evans | ................... | E21B 17/042 285/334 |
| 2010/0253076 A1 * | 10/2010 | Beard | ................... | F16L 37/138 285/333 |
| 2013/0200615 A1 * | 8/2013 | Nussbaumer | ........... | F16L 15/00 285/390 |

OTHER PUBLICATIONS

Austrian Search Report dated Aug. 27, 2012 corresponding with Austrian Application A 161/2012.

* cited by examiner

THREADED CONNECTION OF HIGH-PRESSURE FLUID-CARRYING COMPONENTS OF AN INJECTION DEVICE FOR INTERNAL COMBUSTION ENGINES

CROSS-REFERENCE TO RELATED APPLICATION

This U.S. application claims the foreign priority filing date benefit of Austrian Application A 161/2012, filed Feb. 7, 2012, and the full disclosure of said Austrian application is hereby incorporated herein by reference.

FIELD OF THE INVENTION

The invention relates to a threaded connection of high-pressure fluid-carrying components of an injection device for internal combustion engines, wherein a first component comprises an internal thread on a tubular end portion and a second component comprises an external thread that is screwable into the internal thread, said second component being clampable by an end face against a resting surface of the first component when tightening the threaded connection.

The invention further relates to a method for producing such a threaded connection as well as a first component for such a threaded connection.

BACKGROUND TO THE INVENTION

Common rail systems for heavy diesel engines require large accumulator volumes for hydraulic reasons. Hence result—also for manufacturing reasons—large sealing diameters for sealing the high-pressure-loaded components. In terms of thread load, those large sealing diameters are disadvantageous in threaded connections. On the one hand, high prestressing forces have to be used and, on the other hand, the dynamic load on the thread is increased by the pulsating internal pressure load.

At present, a relief of the thread can practically and effectively only be achieved by increasing the base radius of the thread—in order to reduce the notch effect—and by increasing the diameter of the thread—which entails an increase in the force-transmitting surface. A positive influence on the load-carrying capacity of the screw connection can, moreover, be achieved by an improved material quality, an increased pitch, in particular with highly hardened and tempered screw connections, heat treatment techniques, thread manufacturing (final tempering—final rolling), and via the lubrication state. Geometrically, the use of tension nuts and threads with flank angle differences as well as high screw-in depths may be helpful for the fatigue strength.

All of the usable measures mentioned are, however, limited in their effects, in particular where high-prestressing forces are required.

BRIEF SUMMARY OF THE INVENTION

The invention, therefore, aims to improve fatigue strength of the threaded connection of high-pressure fluid-carrying components of an injection device for internal combustion engines in a simple manner.

To solve this object, the invention in a method of the initially defined kind provides that an outer ring imparting an elastic prestress acting in the radial direction is pressed onto the tubular end portion, and the components are subsequently screwed together.

To solve this object, the invention in a threaded connection of the initially defined kind further provides that the first component carries an outer ring, which is externally fastened to the tubular end portion by a press fit.

The invention causes a reduction of the load on the thread by imparting a selective prestress of the internal thread by pressing an over-dimensioned outer ring over the outer surface of the tubular end portion. In order to achieve a selective introduction of internal stresses and a selective change in the load, the compression region is preferably restricted to the free end of the tubular end portion. This causes a relief of the normally highly stressed first turn of the thread, i.e. the turn adjacent the resting surface, by the more rigid and prestressed thread located therebelow. The internal stresses also have positive effects on the first thread turn.

Both the stiffness and load-carrying capacity of the compressed outer ring and the possible overdimension have limiting effects. Compressions of at least 150 N/mm², in particular about 200 N/mm², however, already show very good effects and are readily attainable. At the same time, it has to be made sure that the final turn of the thread will not be overloaded. Depending on these factors, a reduction of the stress by 50% is feasible as a function of the base geometry.

Alternatively, it is also possible to provide a clearance fit instead of a press fit. The supporting effect will reduce the thread stresses in the first turn of the thread.

A particularly advantageous application of the invention relates to a configuration in which the first component is an integrated high-pressure accumulator of a modular common rail injector and the second component is a supporting body of the modular common rail injector.

DETAILED DESCRIPTION OF THE INVENTION

Figure 1:
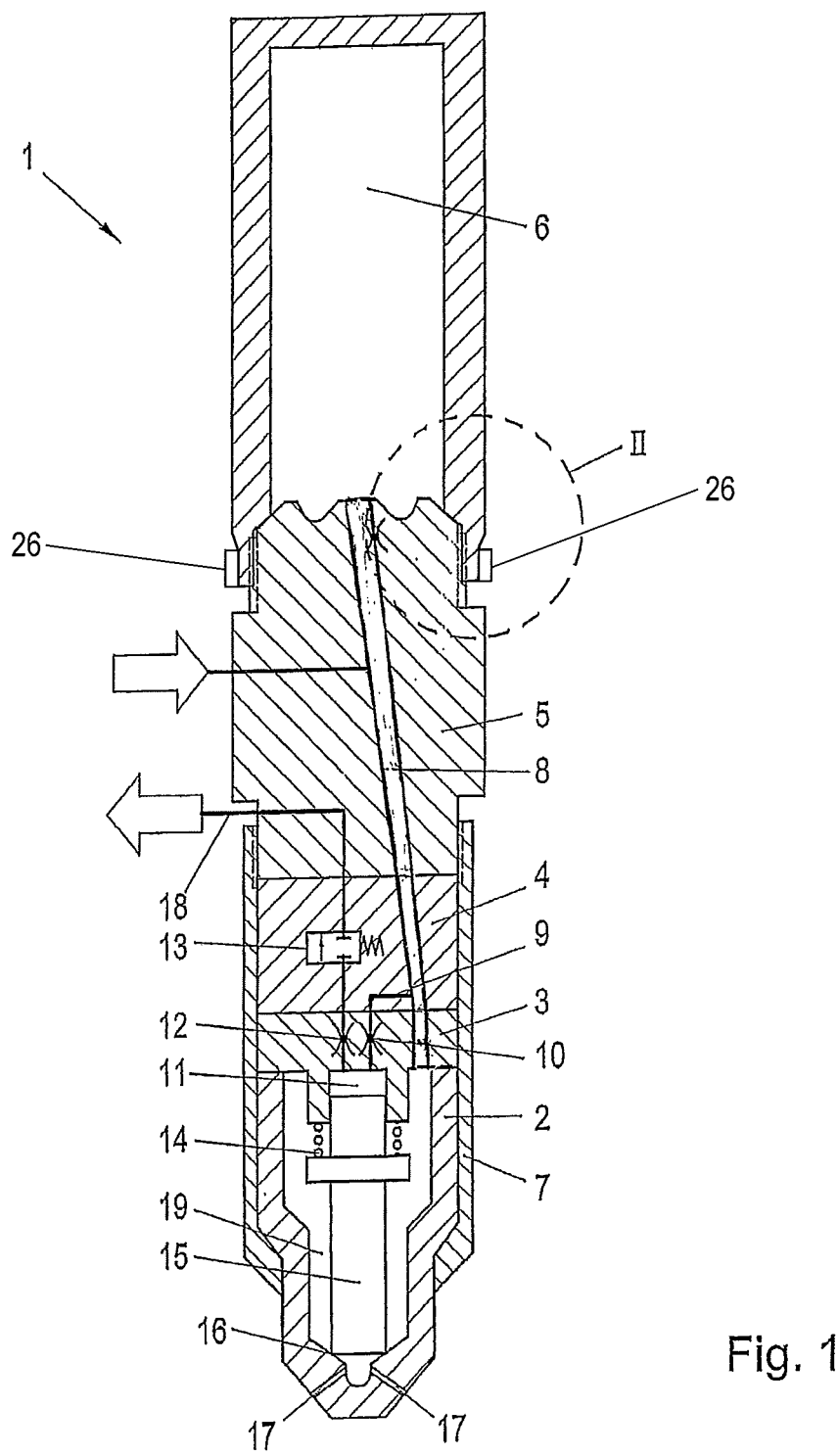
FIG. 1 illustrates the basic structure of a modular common rail injector.

In the following, the invention will be explained in more detail by way of an exemplary embodiment schematically illustrated in the drawing. Therein, FIG. 1 illustrates the basic structure of a modular common rail injector; and FIG. 2 is a detailed view of the threaded connection of the supporting body to the high-pressure accumulator.

Figure 2:
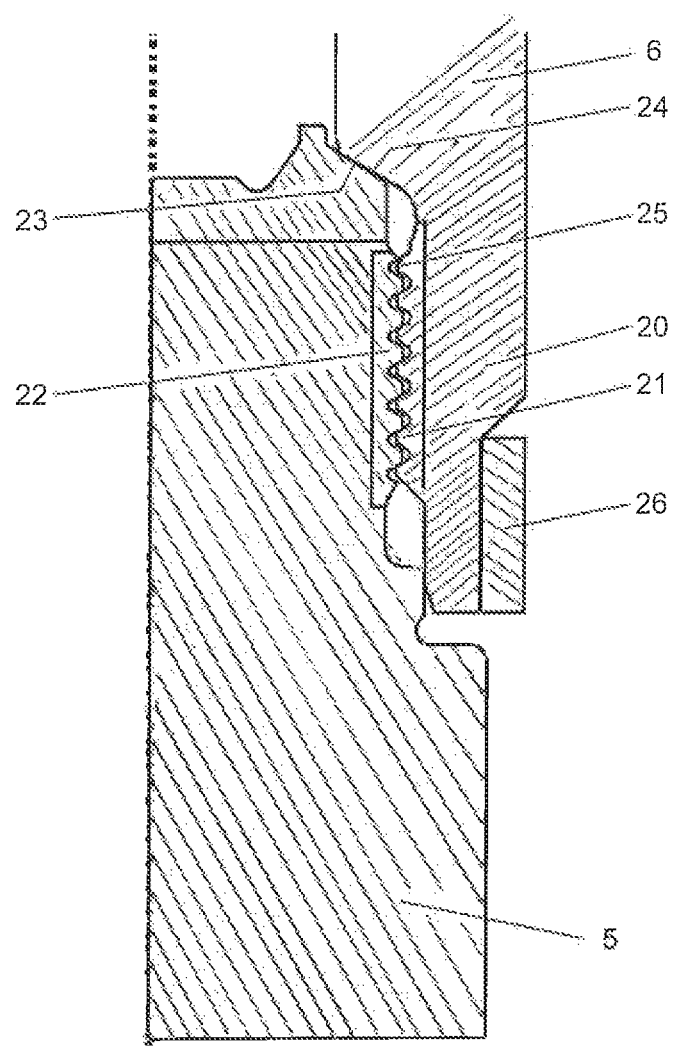
FIG. 2 is a detailed view of the threaded connection of the supporting body to the high-pressure accumulator.

FIG. 1 depicts an injector 1 comprising an injection nozzle 2, a throttle plate 3, a valve plate 4, a supporting body 5 and a high-pressure accumulator 6, a nozzle clamping nut 7 screwed with the supporting body 5 holding together the injection nozzle 2, the throttle plate 3 and the valve plate 4. In the idle state, the solenoid valve 13 is closed such that high-pressure fuel will flow from the high-pressure accumulator 6 into the control chamber 11 of the injection nozzle 2 via the high-pressure line 8, the transverse connection 9 and the inlet throttle 10, yet with the drain from the control chamber 11 via the outlet throttle 12 being blocked on the valve seat of the solenoid valve 13. The system pressure applied in the control chamber 11 together with the force of the nozzle spring 14 presses the nozzle needle 15 into the nozzle needle seat 16 such that the spray holes 17 are closed. When the solenoid valve 13 is actuated, it will enable the passage via the solenoid valve seat, and fuel will flow from the control chamber 11 through the outlet throttle 12, the solenoid valve anchor chamber and the low-pressure bore 18 back into the fuel tank (not illustrated). In the control chamber 11, an equilibrium pressure defined by the flow cross sections of the inlet throttle 10 and the outlet throttle 12 is established, which is so low that the system pressure applied in the nozzle chamber 19 is able to open the nozzle needle 15, which is longitudinally displaceably guided in the nozzle body, so as to clear the spray holes 17 and effect injection.

As soon as the solenoid valve 13 is closed, the fuel drain path is blocked by the outlet throttle 12. Fuel pressure again builds up in the control chamber 11 via the inlet throttle 10, thus creating an additional closing force, which reduces the hydraulic force on the pressure shoulder of the nozzle needle 15 and exceeds the force of the nozzle spring 14. The nozzle needle closes the path to the injection openings 17, thus terminating the injection procedure.

A method for producing a threaded connection between a first component and a second component of an injection device for internal combustion engines, which are provided for carrying high pressure fluid, wherein an internal thread is formed on a tubular end portion of a the first component, into which the second component comprising an external thread can be screwed and clamped against a resting surface of the first component, is characterized in that an outer ring imparting an elastic prestress acting in the radial direction is pressed onto the tubular end portion, and the components are subsequently screwed together.

The compression between the outer ring and the tubular end portion is at least 150 N/mm$^2$, in particular about 200 N/mm$^2$. Preferably, the compression is 200-250 N/mm$^2$.

Injectors of this type are used in modular common-rail systems, which are characterized in that a portion of the accumulator volume present within the system is present in the injector itself. Modular common-rail systems are used in particularly large engines, in which the individual injectors are sometimes arranged in considerably spaced-apart relation. The single use of a common rail for all injectors does not make sense with such engines, since the long lines would cause a massive drop of the injection pressure during the injection, thus considerably reducing the injection rate during extended injection periods. Such engines, therefore, comprise a high-pressure accumulator arranged in the interior of each injector. Such a mode of construction is referred to as a modular structure, since each individual injector has its own high-pressure accumulator and can thus be used as an independent module. A high-pressure accumulator in this case is not meant to be an ordinary line, but a high-pressure accumulator denotes a pressure-proof vessel having a feed line and a discharge line and whose diameter is clearly increased relative to high-pressure lines in order to allow a certain injection amount to be discharged from the high-pressure accumulator without causing an immediate pressure drop.

FIG. 2 depicts an enlarged illustration of the detail II of FIG. 1. The high-pressure accumulator 6 comprises a tubular end portion 20 provided with an internal thread 21. The supporting body 5 is provided with an external thread 22, which cooperates with the internal thread 21 in the state screwed into the high-pressure accumulator 6, of the supporting body 5. When tightening the screw connection, the conical end face 23 of the supporting body 5 is clamped against the conical resting surface 24 of the high-pressure accumulator 6 so as to ensure sealing between the high-pressure accumulator 6 and the supporting body 5. In conventional configurations of the threaded connection, the first turn 25 of the thread will be stressed the most in the clamped state.

According to the invention, an outer ring 26 is attached to the free end of the tubular end portion 20 by a press fit. The press fit is obtained in a conventional manner, e.g. by heating the outer ring 26 and subsequently shrinking the same onto the tubular end portion 20. The outer ring 26 causes the tubular end portion 20 and the internal thread 21 to be elastically prestressed in the radial direction, which will result in a relief of the first turn 25 of the thread when the threads are tightened. The screwing force will be better distributed such that the thread turns that are farther away from the resting surface 24 will be more highly stressed. The outer ring 26 is, in particular, attached in the region of the final thread turns of the internal thread 21. The free end of the tubular end portion 20 comprises a material taper in the radial direction in the support region of the outer ring 26, said taper preferably corresponding to the radial thickness of the outer ring 26.

The invention claimed is:

1. A method for producing a threaded connection between a first component that is an integrated high-pressure accumulator of a modular common-rail injector for an internal combustion engine and a second component that is a supporting body of the modular common-rail injector for an internal combustion engine, which components are configured for carrying high-pressure fluid, said method comprising providing said first component, wherein said first component has a tubular end portion having an interior surface, a resting surface on the interior surface and internal threads formed on another part of the interior surface, the internal threads configured to engage external threads of said second component, providing said second component, wherein said second component has an external thread configured for threadably engaging the internal threads of the first component and having a separate end face configured for being clamped against the resting surface of the first component after the components are screwed together, pressing an outer ring onto the tubular end portion of the integrated high-pressure accumulator of a modular common-rail injector to impart an elastic prestress acting in a radial direction onto the tubular end portion, wherein the elastic prestress imparted by the outer ring imparts a compression between the outer ring and the tubular end portion that is at least 150 N/mm$^2$, and screwing the first and second components together, wherein the compression imparted between the outer ring and the tubular end portion provides relief to a portion of the threads of the first and second components when the first and second components are threadably screwed together, and the resting surface and the end face are pressed against each other by the compression when the integrated high-pressure accumulator of a modular common-rail injector and the supporting body of the modular common-rail injector are screwed together.

2. A method according to claim 1, wherein the tubular end portion has a free end and said pressing comprises pressing the outer ring onto the free end of the tubular end portion.

3. A method according to claim 1, wherein the compression between the outer ring and the tubular end portion is 200-250 N/mm$^2$.

4. A threadably connected pair of high-pressure fluid-carrying components of an injection device for an internal combustion engine comprising a first component that is an integrated high-pressure accumulator of a modular common-rail injector, the first component having a tubular end portion, said tubular end portion comprising an internal thread on a first section and resting surface on a second section; and a second component that is a supporting body of the modular common-rail injector comprising an external thread screwed into the internal thread for threadably connecting the first component and the second component, the second component having an external end face configured for being clamped against the resting surface of the first component when tightening the threaded connection; and an outer ring externally fastened to the tubular end portion of said first component by a press fit for imparting an elastic prestress on the tubular end portion in an inward radial direction, wherein the elastic prestress imparted by the outer ring imparts a compression between the outer ring and the tubular end portion that is at least 150 N/mm², such that when the first and second components are screwed together the compression imparted between the outer ring and the tubular end portion provides relief to a portion of the threads of the first and second components by which the first and second components are threadably screwed together, and so that the resting surface and the end face are pressed against each other by the compression when the integrated high-pressure accumulator of a modular common-rail injector and the supporting body of the modular common-rail injector are threadably screwed together.

5. A threaded connection according to claim 4, wherein the tubular end portion includes a free end and the outer ring is fastened to the free end of the tubular end portion.

6. A threadably connected pair of high-pressure fluid-carrying components of an injection device for an internal combustion engine according to claim 4, wherein the compression between the outer ring and the tubular end portion is 200-250 N/mm².

7. A threadably connected first component and second component of an injection device for internal combustion engines, wherein each component is for carrying high-pressure fluid, said first component is an integrated high-pressure accumulator of a modular common-rail injector and said second component is a supporting body of the modular common-rail injector, the first component having a tubular end portion having an internal surface; internal threads formed on a section of the interior surface; and a section comprising a resting surface formed on the interior surface, wherein the tubular end portion has a free end;

the second component having an external surface; external threads on a section of the external surface, wherein the external threads are configured for engaging the internal threads in the tubular end portion of the first component, said second component having an unthreaded section of the external surface that is configured for being compressed against the resting surface of the first component;

an outer ring press-fitted over a portion of the tubular end portion to form a compression region imparting an elastic prestress inwardly acting in the radial direction onto the tubular end portion, wherein a region overlaid by the outer press ring comprises a compression region; and wherein the first and second components are screwed together via the respective internal and external threads, and the free end of the tubular end portion of the first component is not threadably engaged with said second component, wherein the resting surface is compressed against the unthreaded portion of the exterior surface of the second component by the outer ring, wherein the compression imparted in the compression region provides stress relief to a portion of the threads of the first and second components by which the first and second components are threadably screwed together, and wherein the compression between the outer ring and the tubular end portion is at least 150 N/mm².

* * * * *